May 26, 1931.  R. LIEBAU  1,806,857

METHOD OF MAKING SOLID TIRES

Filed Dec. 1, 1926

INVENTOR
Richard Liebau
By Green & McAllister
His Attorneys

Patented May 26, 1931

1,806,857

UNITED STATES PATENT OFFICE

RICHARD LIEBAU, OF PITTSBURGH, PENNSYLVANIA, ASSIGNOR TO THE REPUBLIC RUBBER COMPANY, OF YOUNGSTOWN, OHIO, A CORPORATION OF OHIO

METHOD OF MAKING SOLID TIRES

Application filed December 1, 1926. Serial No. 151,923.

This invention relates to a method of making solid tires for vehicles, and more particularly to a method of forming the tread portions thereof.

One well known method of manufacturing tires of this type consists in winding a strip of hot rubber stock as it comes from a calender around an annular base until a rubber ring of sufficient size to be shaped into a tire is provided. It will be apparent that tires made in this manner are composed of a number of concentric layers of material, the grain or fibre of which runs in the same direction, so that the product is subject to peeling and separation from the rim or base due to poor adhesion.

Solid tires are also made by the extrusion method on a tube machine and while tires made by this latter process partially eliminate the undesirable concentric formation they do not wear well, due to the relatively soft material which must necessarily be used in this method of manufacture.

An object of this invention is to provide a novel method of manufacturing solid tires for motor vehicles which will eliminate the above noted and other objectionable features.

Figure 1:
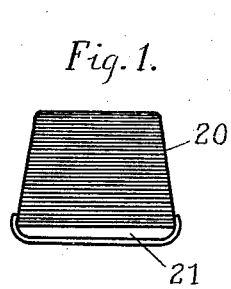
Figure 2:
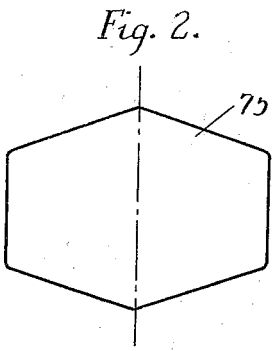
Figure 3:
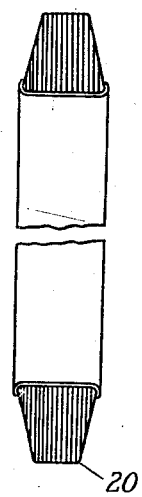
Figure 4:
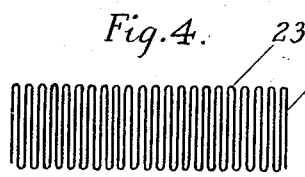
Figure 5:
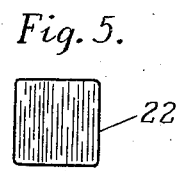
Figure 6:
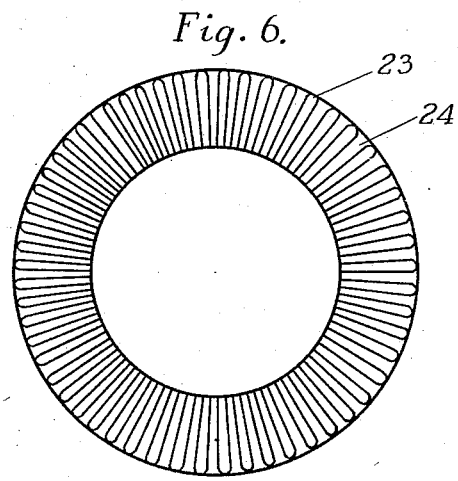
Figure 7:
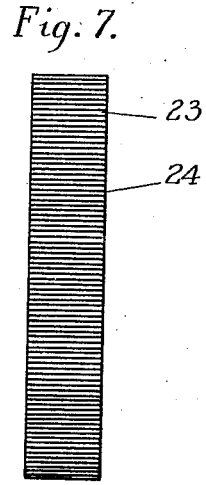

This and other objects which will be apparent to those skilled in this particular art are accomplished by means of the present invention, one embodiment of which is illustrated in the accompanying drawings, wherein Figure 1 is a somewhat diagrammatic cross sectional view of a tire made by the first method above described, showing the objectionable feature of the concentric layers. Fig. 2 is a diagrammatic view showing the method of forming duplicate tire blanks from a single piece of stock. Fig. 3 is a view similar to Fig. 1, illustrating another form of tire made by a prior art method. Figs. 4 and 5 are diagrammatic views showing in side and end elevation, respectively, the formation of tire or tread stock in accordance with the present invention. Figs. 6 and 7 are similar views showing the formation of the stock into an annular tire as employed upon a motor vehicle.

It will be apparent that the well known method of forming solid tires by winding strip material upon an annular support, as above referred to, will provide a tire as illustrated in Fig. 1, having concentric layers 20 of material, and it will also be apparent that the grain of each layer extends parallel to the longitudinal axis of the tire stock and in the direction of travel of the finished tire upon a vehicle. The result of such a formation is that the tire is readily subjected to peeling of the layers, particularly after it has been cut, and it is also subject to separation from the hard rubber base 21, upon which the material has been wound due to lack of adhesion.

Another form of tire known to the prior art is that diagrammatically shown in Fig. 3 in which the layers 20 are so positioned as to extend radially outwardly from the hub. Such a formation fails to prevent the objectionable peeling and the grain of these layers, like that shown in Fig. 1, extends circumferentially around the finished tire in a direction parallel to the longitudinal axis of the tire stock.

I have found that a tire which is so formed that the layers of material from which it is made extend radially outward in the finished tire and at the same time lie in planes transverse to the longitudinal axis of the finished stock will successfully eliminate any possibility of separation of the individual layers of stock known as peeling. In such a tire the grain of the layers also extends transversely across the longitudinal axis of the tire stock with the result that the resistance to wear of the finished article is materially increased at the same time that the possibility of either peeling or separation at the base is eliminated.

The preferred method of manufacturing a tire of this character is diagrammatically illustrated in Figs. 4 to 7. The hot strip material received from the usual calender is folded back and forth upon itself as shown in Fig. 4 so as to provide an elongated piece of tire stock 22 having a plurality of laminations 23 formed by the continuous folding and pressing together of the original strip material and which extend across the longitudinal axis of the stock. It will be apparent that this manner of folding the strip material also produces tire stock in which the grain of the individual laminations, like the laminations themselves, extends transversely to the longitudinal axis of the stock as shown in Fig. 5. The folds or laminations 23 are pressed together as they are formed so as to produce a unitary slab. This slab is then cut and shaped to the form of the standard tire and is mounted upon the usual rim or annular base. The result is a tire 24, such as diagrammatically shown in Figs. 6 and 7 having radial laminations 23 which extend transversely across the longitudinal axis of the tire body and the grain of which runs from the inner to the outer periphery or vice versa rather than concentrically around the tire. Obviously, such a tire is not subject to peeling, slivering or separation and the grain formation is such as to present the greatest resistance to wear.

The laminated slab is preferably shaped into the form of blank 75 illustrated in Fig. 2. Such a blank can be cut centrally so as to provide two tire blanks from a single slab.

What I claim as new and desire to secure by Letters Patent is:

1. The method of making solid tires which includes forming a strip of material, folding said strip so as to provide a plurality of laminations, pressing the folds together to form a slab having crosswise extending laminations, shaping and cutting said slab to size and securing said slab to an annular rim with said laminations extending transversely across the circumference thereof, and radially outward from the point of contact with said rim.

2. The method of producing a tread portion of an elastic vehicle tire which consists in folding a strip of rubber back and forth upon itself to form a compact assembly of contacting folded portions, and then removing the series of turned over edges formed along one edge of the assembly.

3. The method of producing a pair of tread portions for elastic vehicle tires which consists in folding a strip of rubber back and forth upon itself to form a compact assembly of contacting folded portions, and then cutting the assembly through a plane intermediate its two opposite series of turned over edges.

4. The method of producing a vehicle tire which consists in folding a relatively long and narrow strip of tire material back and forth upon itself to form a compact assembly of contacting folded portions, then removing the series of turned-over edges formed along one edge of the assembly by cutting longitudinally through the assembly, and then mounting said assembly on a rim by securing to the rim the surface of the assembly formed by the cutting operation.

5. The method of producing a pair of vehicle tires which consists in folding a relatively long and narrow strip of tire material back and forth upon itself to form a compact assembly of contacting folded portions, then cutting longitudinally through the assembly in a plane parallel to and substantially midway between the surfaces formed by the opposite series of folded-over edges to form a pair of tread portions, and then mounting each of said tread portions on one of a pair of rims by securing to the periphery of each rim the surface of one of the tread portions formed by the cutting operation.

In testimony whereof, I have hereunto subscribed my name this 29th day of November, 1926.

RICHARD LIEBAU.